United States Patent [19]

Boutilier

[11] Patent Number: 4,986,059
[45] Date of Patent: Jan. 22, 1991

[54] BALL JOURNAL DEVICE FOR CONNECTING A SHAFT TO A HARNESS

[76] Inventor: M. Gaylord Boutilier, P.O. Box 236, East Livermore, Me. 04228

[21] Appl. No.: 519,325

[22] Filed: May 8, 1990

Related U.S. Application Data

[63] Continuation of Ser. No. 264,658, Oct. 27, 1988, abandoned.

[51] Int. Cl.⁵ .................................................. B68B 1/00
[52] U.S. Cl. .............................................. 54/2; 54/51; 403/114; 403/328; 403/39

[56] References Cited

U.S. PATENT DOCUMENTS

| | | | |
|---|---|---|---|
| 555,630 | 3/1896 | Whitacre | 54/51 |
| 2,898,797 | 8/1959 | Brownstein | 411/348 |
| 3,117,484 | 1/1964 | Myers | 411/348 |
| 3,596,554 | 8/1971 | Low | 411/348 |
| 4,243,192 | 1/1981 | Johnson | 403/131 |
| 4,447,094 | 5/1984 | Trudeau et al. | 403/39 |
| 4,473,991 | 10/1984 | LaMura et al. | 54/2 |
| 4,662,157 | 5/1987 | Frigon et al. | 54/2 |

FOREIGN PATENT DOCUMENTS 1500179 2/1978 United Kingdom ................ 172/439

Primary Examiner—John Weiss
Attorney, Agent, or Firm—Finnegan, Henderson, Farabow, Garrett and Dunner

[57] ABSTRACT

A hitching device for connecting the shafts of a racing sulky to a harness saddle which includes a harness pin affixed to and extending outwardly from the saddle and a normally locked, spring loaded retractable ball bearing locking devive on the harness pin. A connector assembly is attached to a shaft and retains a rotatable ball provided with an central aperture through the ball and a collar surrounding the central aperture on both sides of the ball. When in the unlocked position the connector assembly slides over the locking device and when in the locked position the connector assembly is positively locked on the harness pin. A spacer is positioned on the harnes pin to maintain the connector assembly at least a preselected distance from the saddle.

19 Claims, 3 Drawing Sheets

BALL JOURNAL DEVICE FOR CONNECTING A SHAFT TO A HARNESS

FIELD OF THE INVENTION

This invention relates to a device for connecting the shafts of a cart or the like to a harness, for example, for attaching the shafts of a racing sulky to a harness.

BACKGROUND OF THE INVENTION

In harness racing, a race horse pulls a two-wheeled cart, or sulky, having a pair of shafts which are attached to a harness saddle circling the horse's body. A breast strap extending around the horse's chest and attached to the saddle or to the shafts by traces may also be used. As the horse runs, it rolls from side to side, i.e., its weight shifts from side to side. This motion is transmitted to the sulky, tending to cause the sulky to fish-tail, or zig-zag, on the track, and to waste the horse's energy.

A thimble over the end of each shaft and attached by a strap to the harness may be used to transmit the horse's motion to the sulky. A safety strap attached to the saddle and wrapped around the shaft is often used to make sure the shafts do not become disconnnected from the saddle. Both of these latter devices also contribute to the fish-tailing effect.

It is also desirable to reduce or eliminate skidding of the sulky on the tracks, which tends to occur when making a turn or changing lanes. The three connections referred to above create a barrier to the ability of the horse and sulky to negotiate a turn, since all the force is directed in a straight line. Thus, the horse upon entering a turn at a high rate of speed tends to be forced ahead and toward the outside, and, at the same time, into a more level position even though the turn is banked. This contributes to the loss of distance, time and racing position.

Attempts have been made to overcome the above-noted disadvantages of the conventional systems for hitching a horse to a sulky by using various ball-joint arrangements. U.S. Pat. No. 4,662,157, for example, discloses a coupling assembly for securing the shafts of a sulky to a saddle wherein a pair of coupling frames are secured to a saddle and are connected to the shafts through a coupling block having a ball-and-socket permitting rotational movement of the shaft relative to the saddle. Each coupling block is secured to a coupling frame by a coupling pin and cotter pin. U.S. Pat. No. 4,326,367 also discloses the use of a pair of ball joints in a device for joining the shafts of a sulky to the harness of a horse. U.S. Pat. No. 4,473,991 discloses a harness connector device wherein a pin secured to the harness fits into a first ball joint connected through a linking member to a second ball joint, which in turn is connected to a shaft.

The conventional systems described in the above-mentioned patents, however, do not satisfactorily solve the problems of fish-tailing and skidding. For example, the last-named harness connector has been investigated and been found by drivers to fail to provide a sense of integration between the horse, sulky and driver. This is because the inclusion of two ball joints destroys the ability of the connection to transmit any feeling of the horse's movements and thus the ability to control the horse while trotting or pacing at any appreciable speed.

In contrast to the above, it has been determined in actual racing conditions that use of the device of the present invention permits vastly improved times and performances and that previously difficult to handle horses raced more evenly.

Therefore, an object of the present invention is a simple, easy to use device for connecting a shaft of a sulky to a harness saddle which reduces, or even eliminates, (1) fish-tailing of the sulky down the straightaways of a track and (2) skidding of the sulky on the track. Other objects and advantages of the present invention will become apparent from the following description and accompanying drawings of a preferred embodiment thereof and from the manufacture and use of the invention.

SUMMARY OF THE INVENTION

To achieve the objects of the present invention there is provided a device for connecting a shaft to a harness which device comprises, in combination: a harness pin assembly adapted to be fixedly mounted on a harness saddle, the harness pin assembly comprising a mounting means for securing the pin assembly to the saddle; an elongated round harness pin having an inner end affixed to the mounting means, the harness pin projecting outwardly from the mounting means at an angle of approximately 90° and having an outer end; and a releasable locking device on the harness pin and positioned intermediate the mounting means and the outer end; and a connector assembly for releasably connecting the harness pin assembly to the shaft, which connector assembly comprises a housing member adapted to be secured to the shaft, the housing member being provided with a ball-retaining aperture means; a ball member rotatably secured in the ball-retaining aperture means and provided with a cylindrical aperture means through the center thereof, the cylindrical aperture means having a diameter adapted to receive the harness pin, and including a collar member extending from opposite sides of the ball member so as to limit the rotation of the ball member in the housing; the locking device is adapted to permit the harness pin to be inserted into the cylindrical aperture means past the locking device when the locking device is in an unlocked position to lock the ball member on the harness pin when the harness pin is in a normally locked position.

Preferably, the mounting means includes a mounting plate for securing the harness pin to the saddle and a spacer is provided on the harness pin for maintaining the connector assembly at a pre selected distance from the mounting plate.

The preferred locking device is a retractable spring loaded ball assembly, positioned in the harness pin, which in its normal position locks the connector assembly on the harness pin, but which permits the connector assembly to be removed from the harness pin by simply depressing a plunger extending from the outer end of the harness pin.

DESCRIPTION OF THE PREFERRED EMBODIMENT

Figure 1:
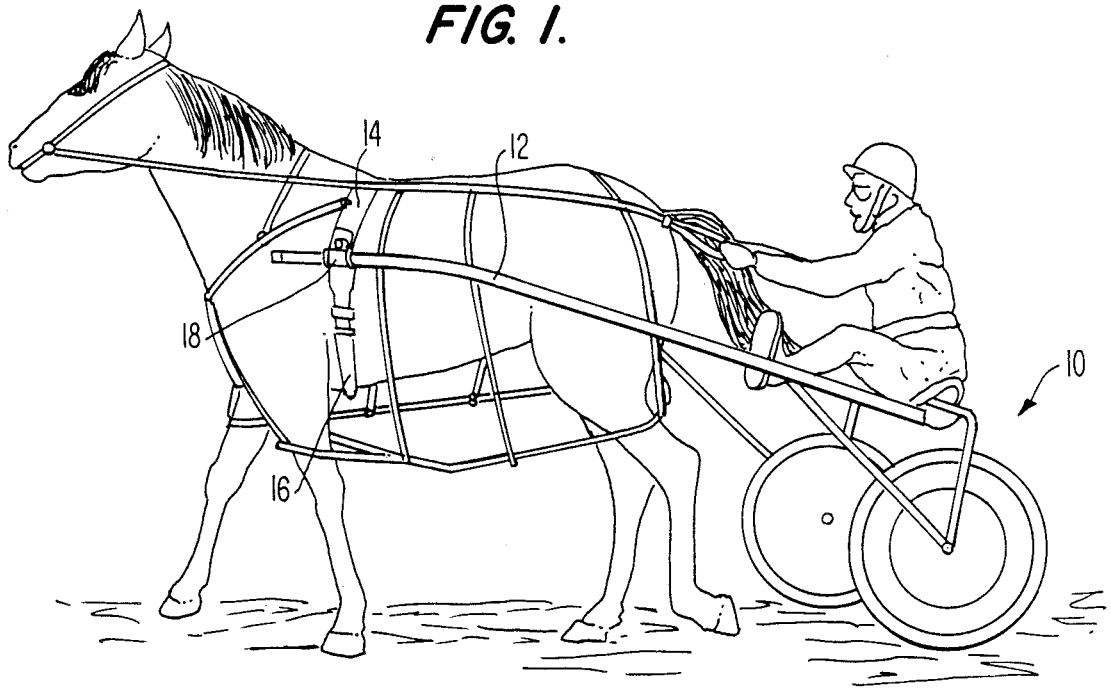
FIG. 1 is a sketch of a racing sulky and horse showing the attachment of the shafts of the sulky to the harness saddle on the horse in accordance with the present invention.

As shown in FIG. 1, a two-wheeled racing sulky 10 has attached to it a pair of long shafts 12 extending forwardly toward a horse which pulls the sulky. The shafts 12 are laterally spaced from each other, one on either side of the horse.

A circumferential harness saddle 14 is secured on the horse by a girth strap 16 which is cinched around the barrel of the horse behind its front legs. In hitching the horse to the sulky, each shaft 12 is secured to the saddle 14 by the connecting device 18 of the present invention, which is hereinafter described.

Figure 2:
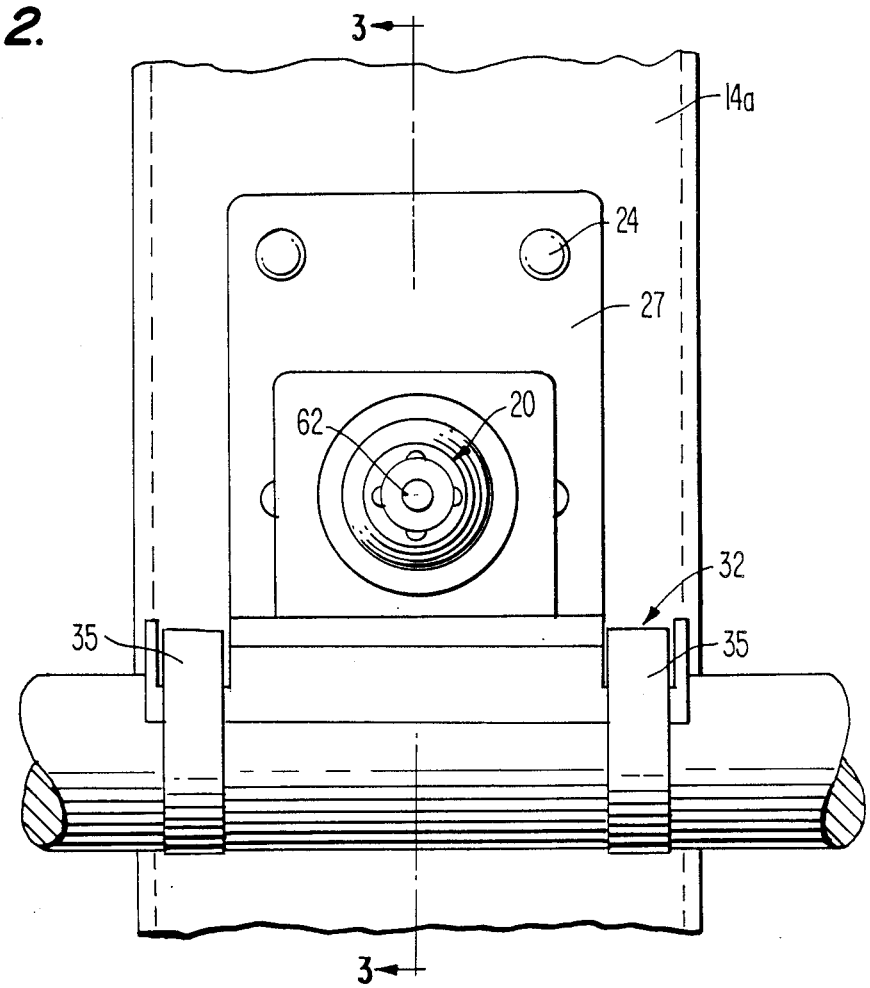
FIG. 2 is a side view of the device of the present invention showing a shaft hitched to a harness saddle.
Figure 3:
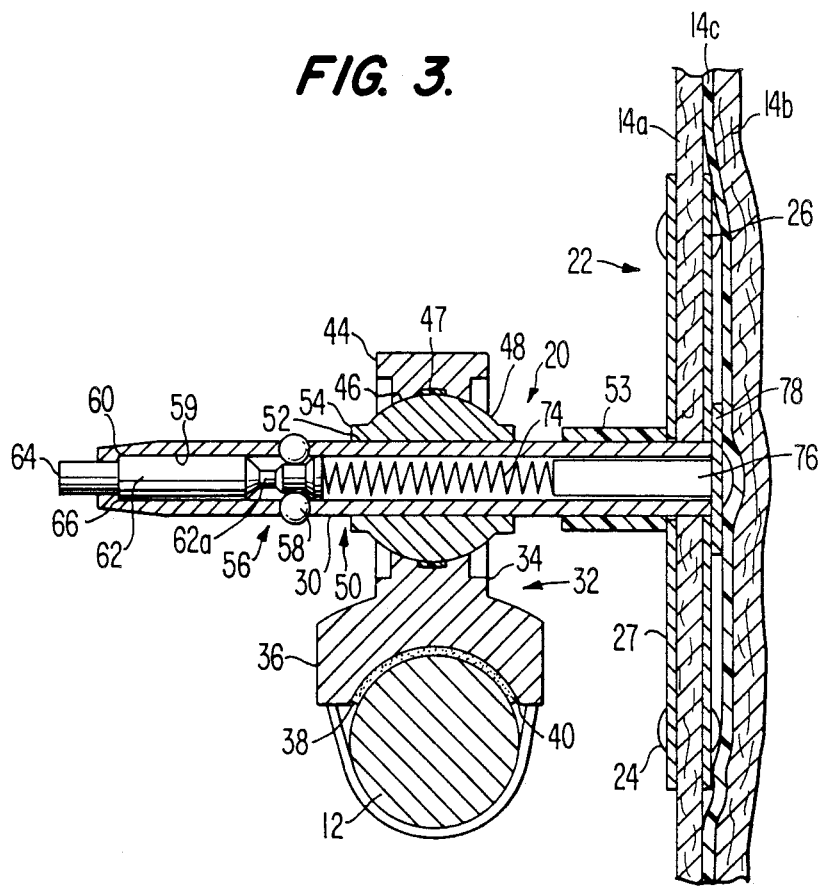
FIG. 3 is a cross-sectional view of the device of the present invention taken at line 3—3 of FIG. 2.
Figure 4:
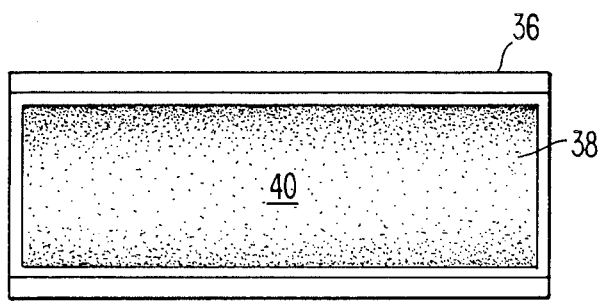
FIG. 4 is a view from the bottom of the connector assembly housing in accordance with the present invention.
Figure 5:
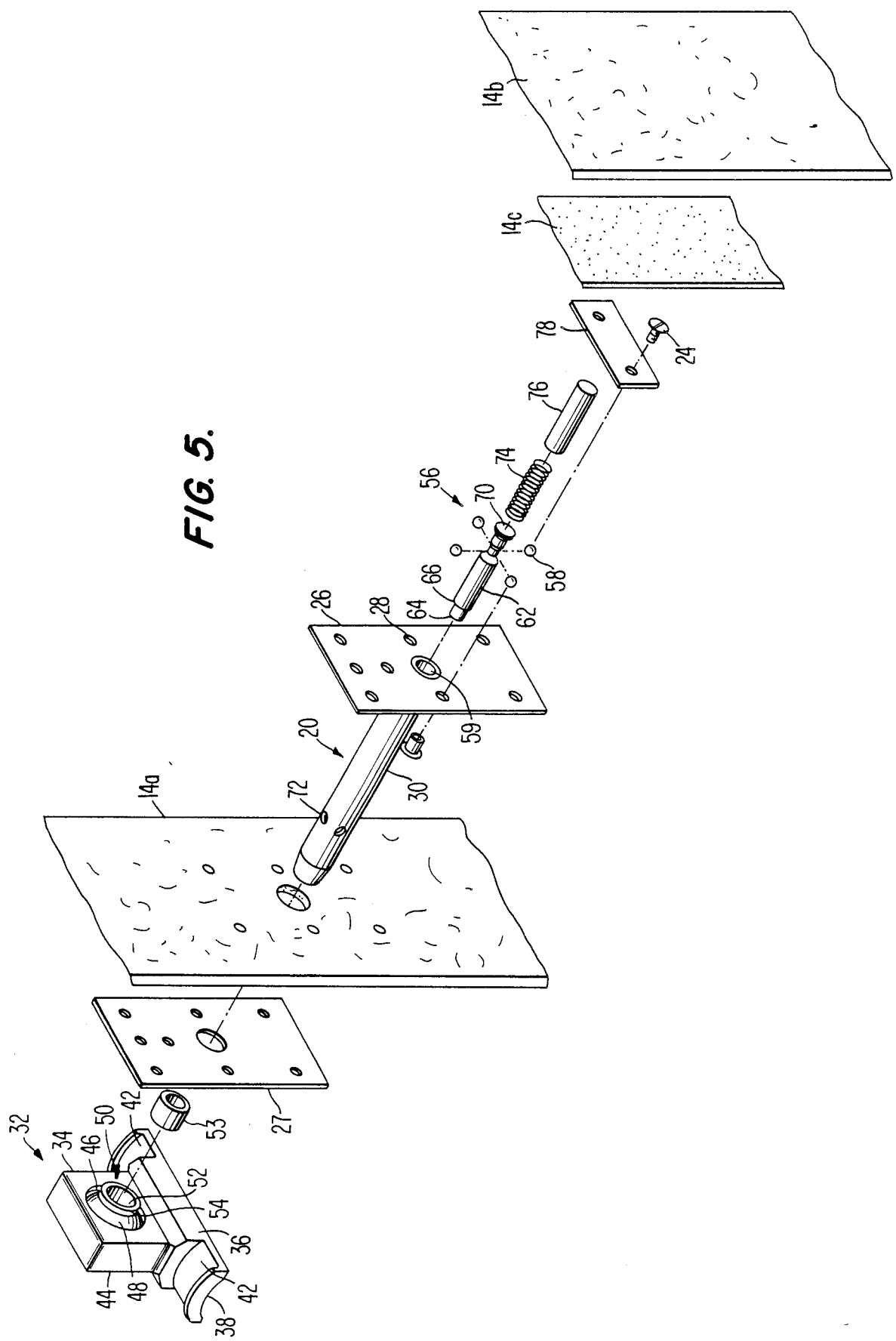
FIG. 5 is an exploded view, in perspective, of the harness pin assembly and connector assembly of the present invention.

It will be understood that, in hitching the horse to the sulky, two identical connecting devices 18 are employed. Each is mounted on the saddle 14 on either side of the horse and attaches to one of the shafts. For simplicity, however, only one connecting device will be described. As shown in FIGS. 2, 3 and 5 each of the connecting devices 18 includes a harness pin assembly 20 firmly secured to the saddle 14, preferably above the mid-line of the horse's side, by a mounting means 22.

The saddle 14 usually is made of sturdy leather formed of an outer strap 14a and an inner strap 14b with a formed plastic cushion 14c between the straps. The harness pin assembly 20 is fastened to the saddle 14 with suitable bolts 24, although rivets or the like may be used. The mounting means 22 includes a first metal mounting plate 26 provided with suitable through holes 28 for insertion of the bolts 24 used to secure the mounting plate 26 to the saddle 14. A harness pin 30, made of a strong corrosion resistant metal, such as a stainless steel, is secured to the mounting plate. The inner end of the elongated, cylindrical harness pin 30 is affixed to the mounting plate 26, for example, by welding, and the pin projects outwardly from the mounting plate at an angle of approximately 90°. In affixing the harness pin assembly 20 to the saddle it is advantageous to position the mounting plate 26 on the inner side of the strap 14a, i.e., the side toward the horse, and to place a second mounting plate 27 opposite the first plate on the outside of the saddle for added rigidity. The fastening bolts 24 and harness pin 30 pass through appropriate holes punched in the saddle and the harness pin assembly is thereby secured to the saddle. As mentioned above, the harness pin assembly is located on the saddle above the mid-line of the horse's side. Therefore, when in use, the harness pin 30 will protrude outwardly from the saddle and point upwardly at an angle of from about 10° to 70° above the horizontal.

Each of the connecting devices 18 also includes a connector assembly 32 secured to a shaft 12. The connector assembly 32 includes a housing member 34 adapted to be secured to a shaft. The housing member 34 includes an elongated base member 36 which fits on the top of the shaft along its longitudinal axis and is secured to the shaft with clamps 35 or other suitable means. Preferably, the base member 36 has an underside 38 curved to fit the shaft and provided with a roughened surface to prevent it from slipping on the shaft. For this purpose, it is preferred to use a friction-increasing material 40, such as one of the commercially available resinous coating materials containing grit, applied to the curved underside. A second curved member (not shown), similar to the curved portion of the base member 36, may be placed on the bottom side of the shaft and used, together with the base member 36, to tightly secure the housing member 34 to the shaft with suitable clamping. Advantageously, notches 42 are provided on the upper surface of the base member to prevent the clamps 35 from sliding off.

The housing member 34, which is advantageously formed of a light-weight casting, such as an aluminum alloy, also includes an upper portion 44 extending substantially perpendicularly from the top of the base member 36. This upper portion of the housing member is provided with a ball-retaining aperture means which includes a central circular bore 46 extending through upper portion 44 and having an axis which is substantially perpendicular to the length of the housing member 34 and, hence, substantially perpendicular to the shaft onto which the housing member 34 is attached. A steel ball member 48 is rotatably held in circular bore 46 so as to be free to swivel, or rotate, therein in all directions. Preferably, the inner surface of bore 46 is provided with friction-reducing seating material 47, such as Teflon or another suitable resin, to facilitate the rotation of the ball 48. Preferably, bore 46 is stepped on both sides of the upper portion 44, the bore having a first larger diameter at its outer ends which permits the desired degree of rotation of the ball 48 and a second, smaller diameter at its interior which is suitable for retaining the ball 48 in the aperture. The ball member 48 is a rounded steel ball provided with a cylindrical aperture means 50 which includes a central core hole 52 passing through the ball and a circular lip, or collars 54 on each side of the ball surrounding the periphery of the core hole. Collars 54 are coaxial with the longitudinal axis of core hole 52 and extend along this axis from the ball a pre-selected distance. This type of swiveling ball joint is known in the machine art as a "high misalignment" ball joint.

The distance by which collars 54 extend from the outer edges of core hole 52, in conjunction with the diameter of the afore-mentioned larger diameter of the bore 46 will determine the degree to which ball 48 may rotate in the housing member. This is because upon being rotated about any axis intersecting the longitudinal axis of core hole 52, collars 54 will strike the inner surface of the larger diameter portion of bore 46 and thereby limit such rotation.

Such a "high misalignment" ball joint provides a significant advantage over a ball joint using a fully rounded ball.

The configuration of the harness pin 30 is extremely significant to the utility of the device of the present invention. The diameter of core hole 52 through of the ball joint has a close tolerance, for example, a 0.002" tolerance in relationship to the diameter of the harness pin. This close tolerance allows for precise steering for the harness racing driver and and a more intimate sense of "feel" and control when negotiating in close quarters in racing situations. In short, this close tolerance, coupled with the ability of the ball joint to rotate relative to the shaft provides the desired precision in driver control over the horse.

To facilitate inserting the harness pin into the core hole 52, the outer end of the pin 30 is provided with a slight taper. The locking device 56 employed in the present invention is of the positive locking type. That is, after the harness pin 30 is fully inserted into the central core hole 52 of ball 48, the ball cannot be removed from the harness pin except by positively releasing the locking device. Further, the locking device is of the type which is normally in the locked position and a positive action, e.g., a manual action, is required to unlock it so as to permit the ball 48 to be removed from the harness pin 30 by sliding the ball over the outer end of the harness pin.

The preferred locking device is in the form of a plurality of locking ball bearings 58 positioned in the harness pin 30 near its outer end and spaced around its periphery. This type of device is known in the art for its utility in close tolerance, high precision work where an object has to slide along a shaft. It provides absolute locking control once the connector assembly 32 is slid from the outer end of the harness pin over the locking ball bearings, the plunger released to its manual position and the connector assembly is positioned between the ball bearings and the saddle. As may be seen, the locking ball bearings are activated by a plunger 62 extending longitudinally from the end of the harness pin 30. In addition to its safety features, this configuration makes it possible to attach a sulky to a harness positioned on a horse in a matter of less than five seconds, whereas two or three minutes are frequently consumed in attaching the harness of a conventional sulky arrangement. Speed of attachment is of great importance to horsemen who frequently use the same sulky in multiple races on a given racing program and have to make a rapid detachment of a sulky from the harness on one horse and equally rapid attachment of the same sulky to the harness on another horse.

A feature important to the utility of the invention is the height and angle of the harness pin 30 as it protrudes from the harness 14. It is essential to the utility of the invention that the connector assembly be able to slide freely along the harness pin. This requires that the harness pin 30 be mounted at an angle of substantially 90° to the base plate of the harness. Any substantial deviation of this angle of the harness pin in relation to the base plate will produce binding of the ball joint's movement calong the harness pin, thus reducing the utility of the device.

Further, experimentation has shown that vertical positioning of the harness pin as it protrudes from the horse's harness, in relation to the contour of the horse's side is also very important. In general, it may be said that the utility of the device is greatly enhanced if the mounting plate is mounted above the mid-line of the horse's side, so that the harness pin shaft will normally be pointed upward at an angle of from 10°-70° above horizontal as it protrudes from the harness in position on the horse.

The length of the harness pin protruding from the harness plate has been found to be critical in two respects. First, and most obviously, the pin must protrude far enough beyond the locking device in the harness pin itself so that the plunger 62 at the end of the harness pin can readily be depressed when the connector assembly mounted on the sulky shaft is brought into position to be slid onto the harness pin during the process of harnessing the horse.

Second, it has been found important that the distance from the inner edge of the housing member 34 to the mounting plate 27 on the harness should be in the range of about 1 3/16" to 1¼" (if the mounting plate sits on the outside of the harness). A spacer 53, preferably a rubber bushing approximately ¾" long, is employed to insure that the connector assembly 32 is kept away from the side of the horse by at least this distance. This is critically important in producing one of the advantages of the device over conventional sulky harness arrangement, namely, to insure that the sulky shafts are held away from the shoulders of the horse. The spacer 53 allows approximately ⅜" of sliding movement by the connector assembly device along the harness pin between the spacer and the locking device 56 in the harness pin. If the connector assembly 32 is held further away from the side of about the horse than the range of 1 3/16" to 1¼, the benefits of the invention are reduced, as the long (up to 7 feet) flexible sulky shafts transmit a swaying, fishtailing motion toward the rear, and thus to the main frame of the sulky. This, in effect, creates the very type of instability which the present invention was designed to eliminate.

By comparison, if the spacer 53 is substantially reduced in length or eliminated, and if the locking device is moved closer to the mounting plate 27, the sulky shaft will be held too close to the horse and the connector assembly will not have sufficient opportunity to slide along the shaft, thus preventing full utilization of the ball joint movement and creating a more rigid relationship between harness and sulky shaft, approaching the conditions experienced with conventional sulky harness connections.

The effects of too rigid a relationship between harness and sulky shaft are several. Most importantly, such a relationship will transmit the vector force of a turning horse backward along the sulky shaft in such a fashion that the wheels of the sulky go around a turn in a series of minute slide, catch, slide, catch actions of the wheels in a direction transverse to the turning radius of the horse's body as it goes around a turn of a racetrack. This produces a notable "chattering" sensation when rounding a racetrack turn, and significantly reduces the efficiency of the horse's pulling movement.

Additionally, a too-rigid relationship between sulky shaft and harness, which causes the shaft to be confined too closely to the side of the horse, will cause the tip of the sulky shaft to press against the horse's inside shoulder while rounding a turn. This impedence is irritating to a horse, sometimes causing the horse to break stride while either pacing or trotting, and tending to force the horse to run straighter, and thus to the outside of the turn. This, obviously, has the ultimate effect of causing the horse to take a wider turn than is necessary, costing yards and time in competitive racing situations.

As previously indicated, conventional strap-held harnesses require a three point contact between the harness and each sulky shaft. The device of the present invention, however, requires only one such contact, or pivot point, per shaft. This single pivot point per shaft contributes significantly to the smoothness of turn, freedom from chatter and shoulder irritation described above.

The locking device 56 includes at least one, and preferably a plurality of, i.e., four, steel balls 58 positioned in the harness pin 30 near its outer end. The locking balls 58 normally extend radially outward from the pin, but are retractable into the pin when the device is unlocked. The harness pin 30 is provided with a central bore 59 which is coaxial with the longitudinal axis of the pin and extends the length of the pin. Near the outer end of pin 30 an internal restriction 60, which may be a shoulder or the like, is provided on the inner surface of the bore. A piston, or plunger, 62 is held in the central bore 59 of the pin 30 and normally extends approximately ⅜" longitudinally from the outer end of the pin 30. The outer end 64 of the plunger 62 has a diameter which permits it to easily slide in bore 59. A shoulder 66 is provided on the plunger away from the outer end 64 The plunger 62 is prevented from coming out of the outer end of bore 59 when shoulder 66 abuts the restriction 60. The mid portion 62a of plunger 62 is tapered to a diameter which is smaller than the diameter of the rest of the plunger and which is positioned opposite the four radial bores 72, spaced around the pin and located near the outer end of the pin 30, when the plunger 62 is depressed into the pin. Four locking ball bearings 58 are retained in the radial bores 72. Ball bearings 58 are held between the pin 30 and plunger 62 and are urged radially outward from the outer surface of pin 30 when they slide along the taper onto the larger diameter portion of the plunger 62 which is opposite the radial bores 72 where the plunger is in its normal position. The balls 58 can be retracted into the pin 30 when the plunger is depressed and the reduced diameter portion is moved opposite the radial bore 72.

A coil spring 74 abuts the inner end 70 of the plunger and the outer end of a second plunger 76. A keeper plate 78 covers the opening on the inner end of central bore 59 and is secured in position by bolting it to the mounting plate 26. When the keeper plate 78 is bolted over the inner end of the second plunger 76, which tends to project out of the inner end central bore 59, the coil spring 74 is compressed. In the normally locked position, the spring 74 urges the plunger 62 outwardly, and locking ball bearings 58 extend outwardly from the circumference of pin 30 so that the distance across the outer portions of the extended balls 58 is greater than the internal diameter of the central core hole 52 in ball 48. When plunger 62 is sufficiently depressed into pin 30, the locking ball bearings 58 become retractable into the central bore 59 of the pin 30.

Thus, to connect the sulky 10 to the saddle 14, the outer end of plunger 62 is depressed and the pin 30 is inserted into the central core hole 52 of the connector assembly 32 which is then slid over the locking balls 58. Then the plunger is released and the locking balls 58 are forced outwardly from the pin 30 to prevent the connector assembly 32 from sliding off the harness pin. To unhitch the sulky, the plunger 62 is depressed until the locking balls 58 can be retracted into the harness pin and the connector assembly can slide over the harness pin. In addition to the positive locking feature of the ball bearing lock in the harness pin shaft, the present invention can, as mentioned above, be attached or detached from a horse extremely rapidly. This feature is especially important in the event of an accident, such as a fallen horse during a race.

With a conventional harness, it is virtually impossible to free a fallen horse rapidly from his leather straps, without cutting the harness or requiring the horse to stand. During a race, there is frequently no time to get any heavy-duty cutting implement to cut the leather harness. Frequently the sulky, harness and horse will be so intertwined that it is impossible to extract the horse rapidly. Since harness races are frequently conducted on tracks of ½ to ⅝ mile, and the horses make two revolutions around the track, an accident which sends a horse down during a race can pose a very serious threat of injury, not only to the fallen horse and its driver, but also to the other competitors in the race and their horses. The ability to simply push the plunger and free a sulky shaft from its relationship to the horse is a strong safety benefit inherent in the present invention.

Further, the present invention, through use of the high misalignment swivel joint, eliminates the possibility of the feared "catapult" or "slingshot" effect if a horse stumbles and falls forward at high speed with a sulky fastened by conventional harness. During a race, harness horses may attain speeds of 30 miles per hour or more. If a horse suddenly stumbles forward, the rigid connection between a conventionally harnessed horse and the sulky trailing behind it has the effect of hurling the seat end of the sulky, and the driver seated thereon, forwardly in an arch over the back of the falling or fallen horse. In effect, the driver literally becomes the equivalent of a rock in a slingshot or catapult. Many very serious injuries have resulted from drivers being catapulted either onto the track where they may become trampled by passing horses, or onto or in front of their own fallen horses which are frantically trying to get up. With a rigidly bound, conventional harness, there is nothing to absorb the kinetic energy created by the sudden reduction of forward speed from 30 miles per hour to zero, except to hurl the driver through the air.

By contrast, the high misalignment joint in the present device absorbs this kinetic energy, due to its capacity to swivel a full 360°. Since the momentum of the falling horse is not transmitted through the swivel joint to the shaft of the sulky, the rear or seat end of the sulky will remain on the ground, with a much reduced risk of injury to the driver of the fallen horse.

Another positive feature of the present invention is the consistency associated with the permanently fixed components of the harness pin—connector assembly, in contrast to the varying position of the sulky shafts in relation to the horse when the horse is harnessed with leather straps which are subject to expansion and contraction under varying race and weather conditions.

Another control feature of the present device is that, when using the present invention, the sulky can consistently be connected to the horse's harness with the same comparative position between the back end of the horse and the sulky seat. Some horses pull especially hard on the reins at all times. With a conventional harness, it is frequently necessary to hitch such horses to the sulky at the very end of the sulky shaft, allowing maximum room between the rear of the horse and the sulky seat. This is so, because the driver must pull extra hard on the reins to restrain the horse. If the sulky shaft were connected to the harness too far toward the rear (driver's end) of the sulky, the cross member of the sulky would be struck by the horse's rear legs while in motion, thus causing potential serious injury to the back of the horse's rear legs. The alternative is to attach the sulky shaft to the harness near the end of the shaft. However, positioning the sulky excessively far from the rear of the horse causes the driver to adjust the handholds in his reins closer to the rear of the horse so that the he can obtain leverage to control the horse. Even so, proper control of such horses is difficult to obtain, and prevents the driver from employing the widest possible range of control of the horse at various points during a race.

Finally, the comfort of the present invention is not only highly useful in obtaining better racing performance from harness horses, it may make the difference between the ability of such horses, particularly young ones, to stay "on gait" or not, whether pacing or trotting. If a horse cannot remain on gait, it is not allowed to race competitively, and his economic value to his owner is greatly diminished. It has been observed that the far greater freedom of movement of the horse while hitched to the sulky by means of the present invention, coupled with the fact that the sulky shafts do not protrude into the horse's shoulders in turns, have combined to make competitive, soundly-gaited race horses out of a number of animals who were previously thought to be only "problem children" without any racing potential.

Having described a preferred embodiment of the present invention, it will be understood that variations and modifications thereof falling within the spirit and scope of the invention will become apparent to those skilled in the art and the scope of the invention is to be determined by the appended claims and their equivalents.

What is claimed is:

1. A device for connecting a shaft to a harness which device comprises, in combination:
   (a) a harness pin assembly adapted to be fixedly mounted on a harness saddle which pin assembly adapted to be fixedly mounted on a harness saddle which pin assembly comprises mounting means for securing said pin assembly to said saddle; an elongated round harness pin having an inner end affixed to said mounting means, said harness pin projecting outwardly at an angle of approximately 90° from said mounting means and having an outer end; and a normally-locked releasable locking device on said harness pin and positioned intermediate said mounting means and said outer end; and
   (b) a connector assembly for releasably connecting said harness pin assembly to said shaft which connector assembly comprises a housing member comprising an elongated base member having a topside, an underside and an upper portion rigidly secured to and extending substantially perpendicular from the topside of said base member eliminating any relative movement between the base member and upper portion, the underside of said base member being adapted to fit on said shaft along the longitudinal axis thereof and said base member being adapted to be secured to said shaft, said upper portion being provided with a ball-retaining aperture means positioned over said base member and having an axis substantially perpendicular to the length of said base member; a ball member rotatably secured in said ball-retaining aperture means and provided with a cylindrical core hole through the center thereof adapted to receive said harness pin; said locking device being adapted to permit said harness pin to be inserted into said cylindrical core hole past said locking device when said locking device is in an unlocked position while positively locking said ball member on said harness pin when said locking device is in a normally locked position.

2. The device of claim 1, wherein said locking device comprises at least one retractable member mounted in said harness pin and urged radially outward therefrom by a spring member.

3. The device of claim 2 wherein there is further included a collar member coaxial with said core hole and extending from opposite sides of said ball member so as to limit the rotation of said ball member in said housing to a preselected degree.

4. The device of claim 2, further including a spacer member positioned on said harness pin intermediate said locking device and said mounting means for maintaining said shaft at least a preselected distance from said harness.

5. The device of claim 1, wherein the inner surface of said ball-retaining aperture means is provided with a friction-reducing seating element for facilitating the rotation of said ball member therein.

6. The device of claim 1, wherein said base member includes a curved portion adapted to fit over said shaft, said curved portion having a friction-increasing interior surface.

7. The device of claim 4, wherein said spacer member is a bushing of a rubbery material.

8. A device for connecting a shaft to a harness which device comprises, in combination:
   (a) a harness pin assembly adapted to be fixedly mounted on a harness saddle which pin assembly comprises mounting means for securing said pin assembly to said saddle; an elongated round harness pin having an inner end affixed to said mounting means, said harness pin projecting outwardly at an angle of approximately 90° from said mounting means and having an outer end; and a normally-locked releasable locking device having at least one member normally extending radially from said harness pin, being retractable into said harness pin and positioned intermediate said mounting means and said outer end; and
   (b) a connector assembly for releasably connecting said harness pin assembly to said shaft which connector assembly comprises a housing member adapted to be secured to said shaft, said housing member being provided with a single ball-retaining aperture means; a ball member rotatably secured in said ball-retaining aperture means and provided with a core hole through the center thereof adapted to receive said harness pin; said locking device being adapted to permit said locking device when said locking device is in an unlocked position while positively locking said ball member on said harness pin when said locking device is in a normally locked position.

9. The device of claim 8, wherein said housing member comprises an elongated base member adapted to fit on said shaft along the longitudinal axis thereof and to be secured to said shaft, and said ball-retaining aperture means has an axis substantially perpendicular to the length of said base member.

10. The device of claim 9, wherein said ball member further includes a collar member coaxial with said core hole and extending from opposite sides of said ball member so as to limit the rotation of said ball member in said bearing to a pre-selected degree.

11. The device of claim 10, further including a spacer member positioned on said harness pin intermediate said locking device and said mounting means for maintaining said shaft at least a preselected distance from said harness.

12. The device of claim 9, wherein said harness pin is provided with a bore extending the length of said harness pin and substantially coaxial with the longitudinal axis of said harness pin, a wall surrounding said longitudinal bore and at least one radial bore extending from said longitudinal bore through said wall; and said locking device comprises a spring-loaded, elongated piston in said longitudinal bore, said piston having outer and inner end portions, a mid-portion having a cross-section smaller than that of said end portions and an outer end member normally extending longitudinally from the outer end of said harness pin, said piston being longitudinally slidable in said longitudinal bore and at least one radially moveable ball member retained in said radial bore between said piston and said wall, said ball member normally being extended outwardly from the outer surface of said wall by said inner end portion of said piston and being retractable in said wall when said end member is depressed to move said piston longitudinally against a spring so as to place said smaller cross-section of said position opposite said radial bore.

13. The device of claim 9, wherein said ball-retaining aperture means is provided with a friction-reducing seating element for facilitating the rotation of said ball member therein.

14. The device of claim 9, wherein said base member is an integral part of said housing member, said ball-retaining aperture means is positioned directly above said base member and the longitudinal axis of said ball-retaining aperture means is substantially perpendicular to the length of said base member.

15. The device of claim 14, wherein said base member includes a curved portion adapted to fit over said shaft, said curved portion having a friction-increasing interior surface.

16. The device of claim 11, wherein said spacer member is a bushing of a rubbery material.

17. A device for connecting a shaft to a harness which device comprises, in combination:
 (a) a harness pin assembly adapted to be freely mounted on a harness saddle which pin assembly comprises mounting means for securing said pin assembly to said saddle; an elongated round harness pin having an inner end affixed to said mounting means, said harness pin projecting outwardly at an angle of approximately 90° from said mounting means and having an outer end; and a normally-locked releasable locking device on said harness pin and positioned intermediate said mounting means and said outer end, said locking device comprising at least one retractable member mounted in said harness pin and urged radially outward therefrom by a spring member; and
 (b) a connector assembly for releasably connecting said harness pin assembly to said shaft which connector assembly comprises a housing member adapted to be secured to said shaft, said housing member being provided with a ball-retaining aperture means; a ball member rotatably secured in said ball-retaining aperture means and provided with cylindrical aperture means comprising a core hole through the center thereof adapted to receive said harness pin and a collar member coaxial with said core hole and extending from opposite sides of said ball member so as to limit the rotation of said ball member in said housing to a pre-selected degree; said locking device being adapted to permit said harness pin to be inserted into said cylindrical aperture means past said locking device when said locking device is in an unlocked position while positively locking said ball member on said harness pin when said locking device is in a normally locked position.

18. The device of claim 17, wherein said harness pin is provided with a bore extending the length of said harness pin and substantially coaxial with the longitudinal axis of said harness pin, a wall surrounding said longitudinal bore and at least one radial bore extending from said longitudinal bore through said wall; and said locking device comprises a spring-loaded, elongated piston in said longitudinal bore, said piston having outer and inner portions, a mid-portion having a cross-section smaller than that of said end portions and an outer end member normally extending longitudinally from the outer end of said harness pin, said piston being longitudinally slidable in said longitudinal bore and at least one radially moveable ball member retained in said radial bore between said piston and said wall, said radially moveable ball member normally being extended outwardly from the outer surface of said wall by said inner end portion of said piston and being retractable in said wall when said end member is depressed to move said piston longitudinally against a spring so as to place said smaller cross-section of said piston opposite said radial bore.

19. The device of claim 18, wherein there are four of said radial bores spaced substantially equally around said harness pin, each having one of said radially moveable ball members retained therein.

* * * * *